United States Patent [19]

Domeier

[11] Patent Number: 4,853,449

[45] Date of Patent: * Aug. 1, 1989

[54] BISMALEIMIDE FORMULATIONS CONTAINING OLEFINIC ETHER MODIFIERS

[75] Inventor: Linda A. Domeier, Flemington, N.J.

[73] Assignee: Amoco Corporation, Chicago, Ill.

[ * ] Notice: The portion of the term of this patent subsequent to Mar. 31, 2004 has been disclaimed.

[21] Appl. No.: 142,670

[22] Filed: Jan. 7, 1988

Related U.S. Application Data

[63] Continuation of Ser. No. 885,723, Jul. 15, 1986, abandoned.

[51] Int. Cl.$^4$ ............................................ C08F 226/06
[52] U.S. Cl. .................................... 526/259; 524/700; 526/262

[58] Field of Search ................................ 526/259, 262

[56] References Cited

U.S. PATENT DOCUMENTS 4,654,407  3/1987  Domeier .............................. 526/262
4,689,378  8/1987  Chaudhari ........................... 526/259

Primary Examiner—Christopher Henderson
Attorney, Agent, or Firm—Richard J. Schlott; William H. Magidson; Ralph C. Medhurst

[57] ABSTRACT

Novel bismaleimide resin formulations are described which contain olefinic ether reactive diluents. These formulations provide a combination of prepreg processing characteristics and thermal and mechanical properties unavailable from other reactive diluents. Preferred diluents contain one or more alkyl ether groups.

6 Claims, No Drawings

BISMALEIMIDE FORMULATIONS CONTAINING OLEFINIC ETHER MODIFIERS

This is a continuation of application Ser. No. 885,723, filed July 15, 1986, now abandoned.

FIELD OF THE INVENTION

This invention relates to novel bismaleimide formulations containing olefinic ether diluents. In particular, it relates to the use of liquid reactive diluents containing one or more allyl ether groups to provide bismaleimide formulations having a desirable balance of properties. In a further aspect, the present invention relates to the use of these novel bismaleimide formulations in the preparation of prepreg resins for tape or tow fabrication and the composites prepared therefrom.

BACKGROUND OF THE INVENTION

Advanced composites are high strength, high modulus materials which are finding increasing use as structural components in aircraft, automotive, and sporting goods applications. Typically, they comprise structural fibers such as carbon fibers in the form of woven cloth or continuous filaments embedded in a thermosetting resin matrix.

Most advanced composites are fabricated from prepreg, a ready-to-mold sheet of reinforcement impregnated with uncured or partially cured resin. Resin systems containing an epoxide resin and aromatic amine hardener are often used in prepreg since they possess the balance of properties required for this composite fabrication process. State-of-the-art epoxy/carbon fiber composites have high compressive strengths, good fatigue characteristics, and low shrinkage during cure. However, most epoxy formulations absorb moisture which reduces their high temperature properties. As a result, they are not suitable for use at 300° F. or greater in a moisture saturated condition. There is therefore a need for resin systems which afford composites which can retain a high level of properties at 300° F. under such moisture saturated conditions.

Most prepreg resins designed for use at temperatures of 300° F. or higher are made by combining bismaleimides of Formula I with liquid coreactants containing other reactive groups such as amines, epoxides, cyanates or comonomers containing —CH=CH$_2$, >C=CH$_2$, or —CH=CH— groups which can react or polymerize with the carbon-carbon double bonds of the maleimide groups.

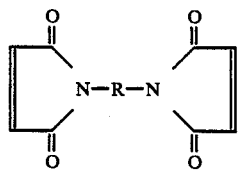

I

In the most common bismaleimides, R is the residue of an aromatic diamine such as methylene dianiline or related derivatives.

A wide range of bismaleimide compositions based on differing aromatic residues or blends of bismaleimides can be used, however. All of these bismaleimides are solids or glasses at room temperature which require liquid coreactants in order to provide a processible and useful resin for composite fabrication.

The range of suitable liquid reactive diluents containing unsaturated carbon-carbon double bonds, however, is currently very limited. Many of the available diluents are restricted by their low boiling points and, therefore, high volatility; by their odor; by their toxicity and/or problems with skin irritation; by their poor ability to dissolve bismaleimides; by their high viscosity which, again, limits the bismaleimide solubility and also leads to little or no tack in the formulation; by their poor thermal stability or hydrolytic stability; by their incompatibility with other formulation modifiers; by their effect on the mechanical properties of the cured formulation; and/or by their tendency to cause rapid cross-linking and gellation of the bismaleimide formulation.

A need clearly exists, therefore, for new and effective reactive diluents which can overcome all or at least many of the above noted problems.

SUMMARY OF THE INVENTION

Applicant has discovered new bismaleimide formulations containing liquid reactive diluents which avoid substantially all of the above-noted disadvantages commonly associated with the prior art diluents.

More particularly, Applicant has discovered that olefinic ethers and especially allyl ethers can act as diluents for bismaleimide formulations to provide cured products with low water absorption and a wide range of glass transition temperatures (Tg). Tg values of 350° C. and higher can be obtained depending on the particular formulation.

An additional advantage of the olefinic ehter/bismaleimide formulations is their ability to B-stage or advance low viscosity formulations to a desired viscosity suitable, for example, for prepreg tow or tape fabrication. Unlike general free-radical curing resins, these formulations show a gradual increase in viscosity without signs of gellation or an abrupt exotherm. This feature is useful in optimizing a given formulation for use in specific composite fabrication techniques.

Moreover, unlike other diluents such as divinylbenzene, olefinic ether reactive diluents provide good stability in the uncured resin and have litle or no odor. Additionally, unlike many low viscosity diluents such as styrene, the diluents of the present invention have low volatility at ambient temperatures.

In contrast to other commonly available allyl diluents such as diallyl phthalate and triallylisocyanurate, the diluents of this invention provide enhanced Tg values and/or mechanical properties.

Still further, unlike diluents which contain residual phenolic, hydroxyl, or other active hydrogen groups, the diluents of the present invention can be used in conjunction with cyanate ester resins without premature gellation.

So too, in contrast to diluents containing multiple ester bonds, the olefinic ether diluents of the present invention provide excellent thermal and hydrolytic stability.

Finally, unlike acrylic or methacrylic diluents, the diluents of the present invention generally do not appear to cause skin sensitivity or other toxicity problems.

Specifically, the new resin formulations of the present invention comprise:
(i) bismaleimide; and
(ii) at least one or more of a reactive diluent which may be described by the following general formula:

[R]̄ₘ[Ar][ZR]ₙ    II where Z=O or S, and where

R = 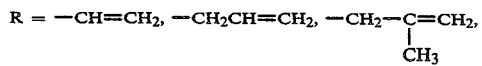

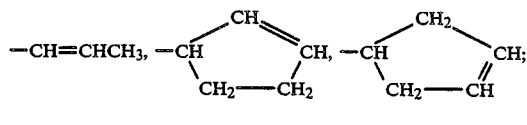

n ≧ 1, m = 0 to 2, m + n ≧ 2

Ar = 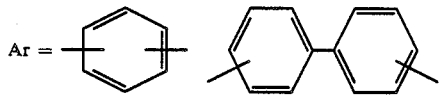

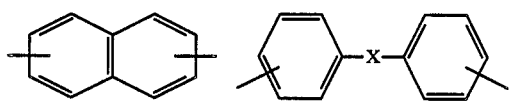

in which X=alkylidene, aryl, arylalkylidene, O, S, SO₂, CO,

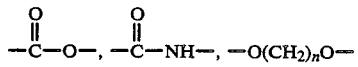

and where Ar may optionally be substituted with alkyl, alkoxy, halogen, and other non-reactive groups.

These formulations may optionally contain additives such as thermoplastics, epoxy resins, amine hardeners, cyanate resins, fillers or other modifiers and may also contain a structural fiber.

DETAILED DESCRIPTION OF THE INVENTION

The allyl and methallyl diluents of this invention are readily prepared from available phenolic materials and allylic halides. Numerous solvents including alcohols, ethers and dipolar aprotic solvents such as dimethyl formamide, dimethyl acetamide and dimethyl sulfoxide may be used as well as both hydroxide and carbonate bases. Propenyl ethers may be prepared by base-catalyzed isomerization of the allyl ethers. Methods for the preparation of vinyl ethers are well known to those skilled in the art.

Preferred diluents include the following structures:

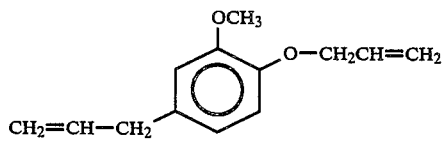                                III

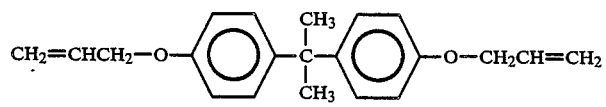                                IV

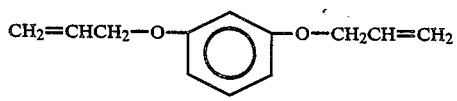  V         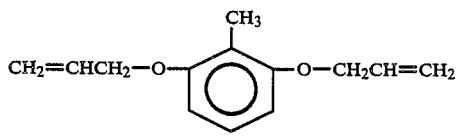  VI

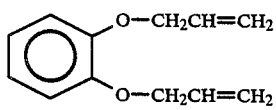  VII        VIII

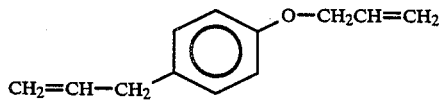  IX       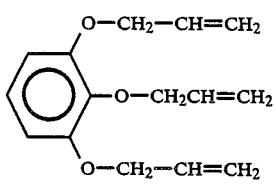  X

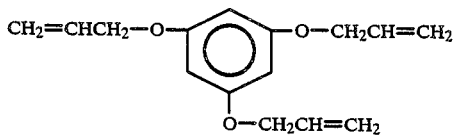  XI       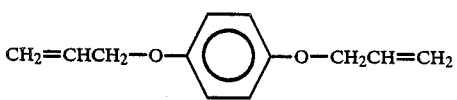  XII

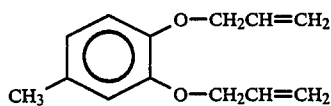 XIII

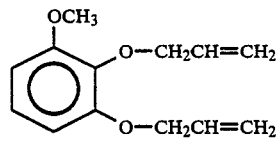 XIV

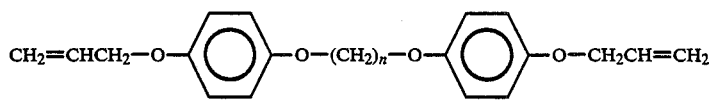 XV n = 1-6

In all of the above structures, it is possible to substitute vinyl ether, propenyl ether or methallyl ether groups for the allyl ether groups show. Allyl ethers are the preferred olefinic ethers.

Additional materials which fall under the broad scope of this invention are those olefinic ethers which are solid at ambient temperature but which may be used as blends with other liquid diluents. Preferred examples of these coreactants include the diallyl ether of biphenol, of bisphenol S, and of naphthalene diol as shown below:

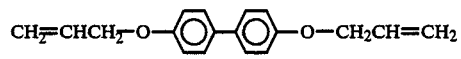 XVI

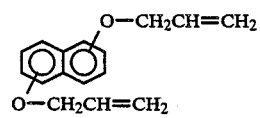 XVII

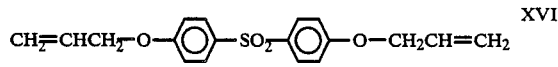 XVIII

The bismaleimides suitable for use in the formulations of this invention are defined by structure I where R can be the residue of an aromatic or aliphatic organic compound. Preferred bismaleimides include the following structures which may be used alone or as mixtures:

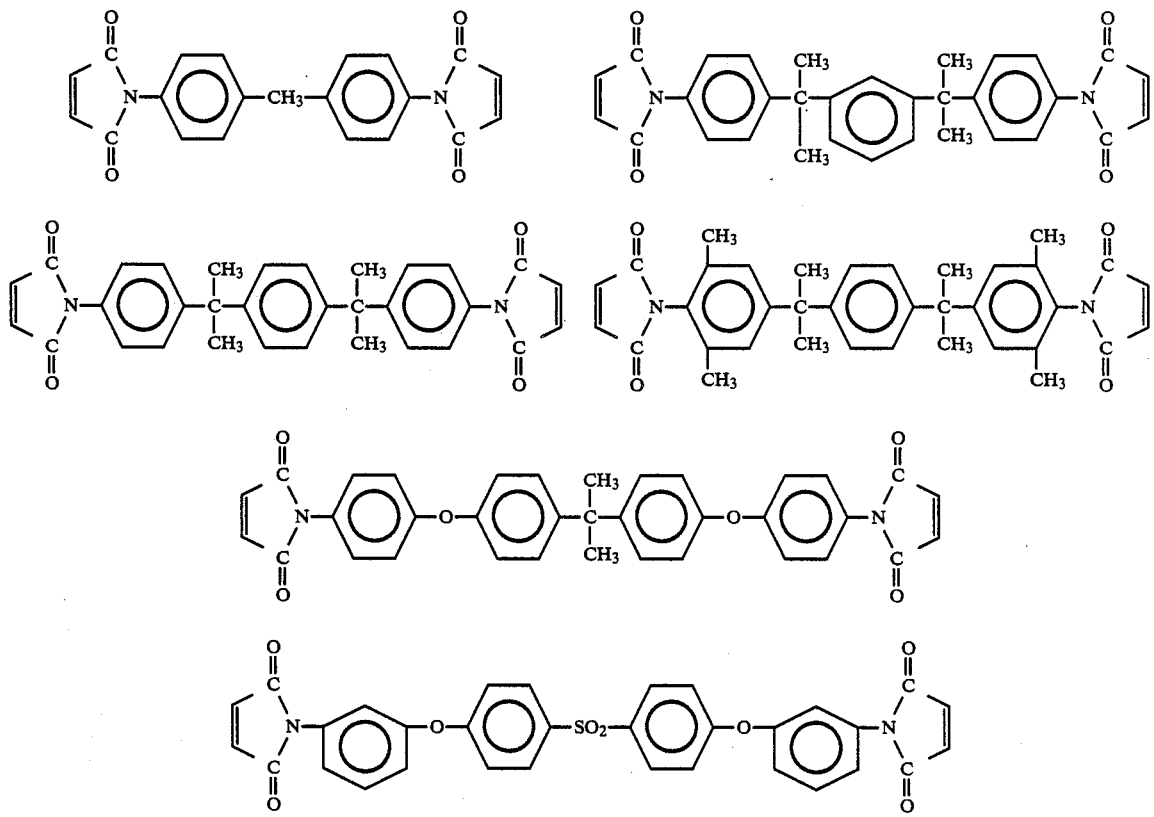

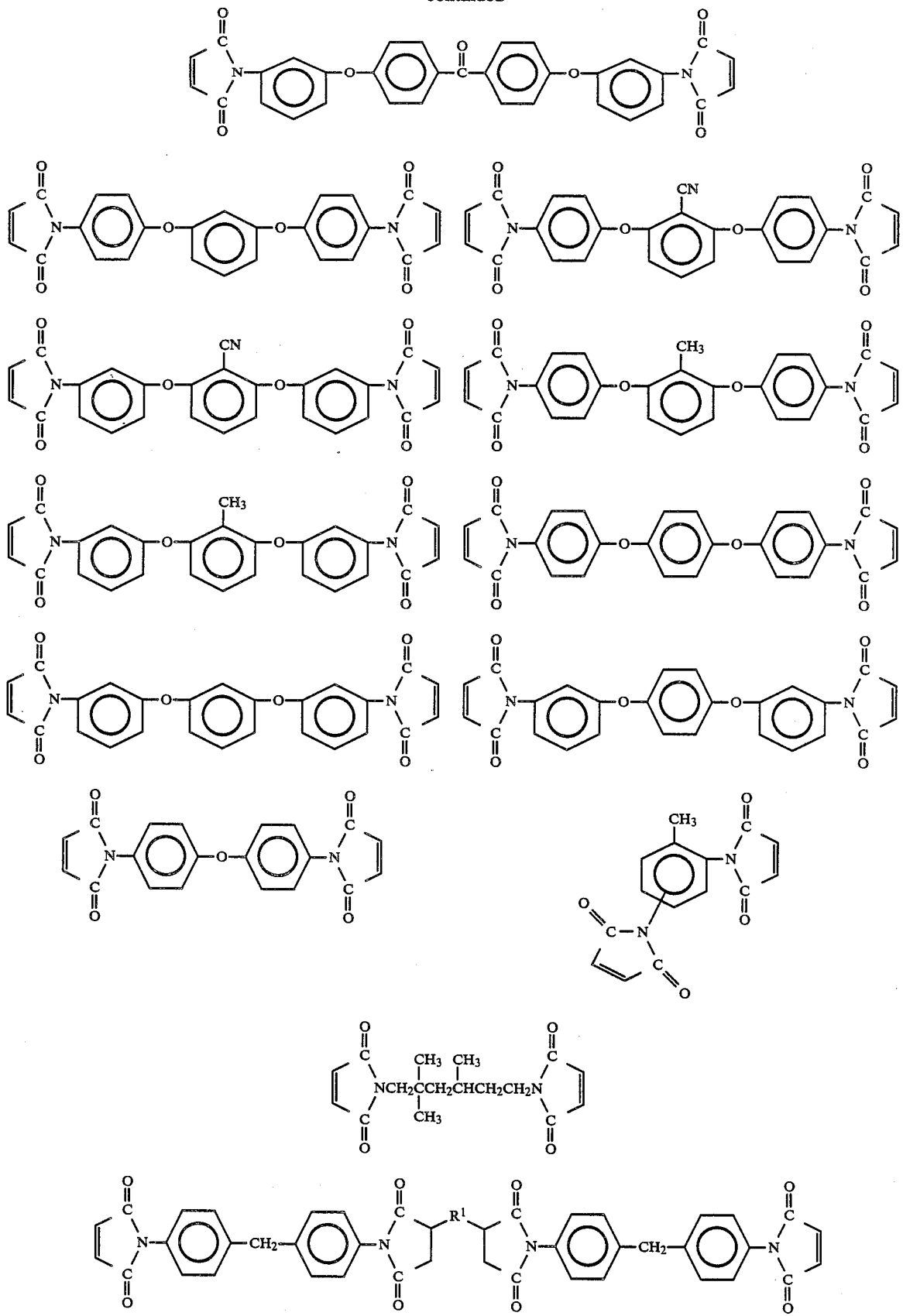

(where $R^1$ is the residue of an aromatic diamine or aminohydrazide.)

Other bismaleimides not specifically shown above may also be used in the present invention. It is also possible to use bismaleimides in which up to 50% of the maleimide groups have been replaced by substituted maleimide groups such as methyl malemides or halomaleimides or by the nadimide, methyl nadimide, or isomaleimide groups shown below:

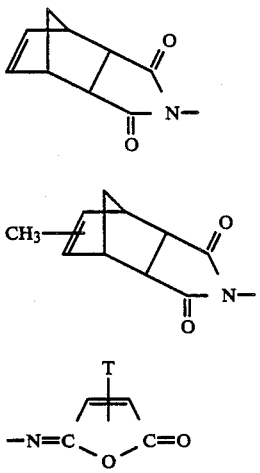

where T=methyl, halogen, hydrogen.

Portions of the malemide groups may also be replaced by succinimide, phthalimide, or substituted succinimide and phthalimide groups.

An advantage of certain of the formulations of this invention is their ability to be controllably "B-staged" or increased in viscosity without the common problem of gellation which is associated with many reactive diluents. In particular, blends of the allyl ether of Eugenol (III) with Compimide 353 (a commercially available mixture of bismaleimides obtained from Boots-Technochemie, Nottingham, England) provide a very low viscosity resin (<180 cps) at room temperature which is suitable for injection into preformed mats of reinforcing fibers. Advancement of this resin at elevated temperatures such as 120°–150° C. can be carried out to provide a similar resin of higher viscosity which is suitable for wet-winding or prepreg tow fabrication. Continued advancement can be carried out to provide a resin viscosity suitable for film-coating and prepreg tape fabrication.

The low viscosity of this and similar resins can also be adjusted by the addition of thermoplastic polymers, particulate fillers, and other conventional resin additives.

In addition to the bismaleimides and olefinic ether diluents used in the formulations of the present invention, other reactive diluents and modifiers may be included in the formulations.

Liquid reactive diluents which can be used as modifiers include N-vinyl-2-pyrrolidinone, N-vinyl caprolactam, ethylene glycol dimethacrylate, diethylene glycol dimethacrylate, ethoxylated bisphenol A dimethacrylate, trimethylolpropane triacrylate, trimethylolpropane trimethacrylate, pentaerythritol triacrylate, pentaerythritol tetraacrylate, pentaerythritol tetramethacrylate, triallyl isocyanurate, triallyl cyanurate, diallyl phthalate and its isomers, tetraallyl pyromellitate, o,o'-diallyl bisphenol A, Eugenol, triallyl trimellitate, divinyl benzene, dicyclopentadienyl acrylate, dicyclopentadienyloxyethyl acrylate, vinylcyclohexene monoepoxide, 1,4-butanediol divinyl ether, 1,4-dihydroxy-2-butene, styrene, alpha methyl styrene, chlorostyrene, p-phenylstyrene, p-methylstyrene, t-butylstyrene, phenyl vinyl ether, unsaturated polyesters, vinyl ester resins, and the like. These comonomers are characterized by the presence of one or more —CH═CH$_2$, >C═CH$_2$, or —CH═CH— groups which can polymerize or react with the maleimide groups of the bismaleimide.

Other liquid coreactants include epoxy resins which contain one or more epoxy groups having the following formula:

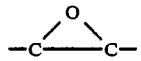

The epoxy groups can be terminal epoxy groups or internal epoxy groups. The epoxides are of two general types: polyglycidyl compounds or products derived from epoxidation of dienes or polyenes. Polyglycidyl compounds contain a plurality of 1,2-epoxide groups derived from the reaction of a polyfunctional active hydrogen containing compound with an excess of an epihalohydrin under basic conditions. When the active hydrogen compound is a polyhydric alcohol or phenol, the resulting epoxide resin contains glycidyl ether groups.

Examples of such poly(glycidyl ether) resins include bisphenol A epoxy resins, epoxy novolak resins derived from phenol-formaldehyde and cresol-formaldehyde novolaks and similar compounds. Numerous examples are available commercially from Dow Chemical Co. and Shell Chemical Co.

Other suitable epoxy resins include polyepoxides prepared from polyols such as pentaerythritol, glycerol, butanediol or trimethylolpropane and an epihalohydrin.

Other polyfunctional active hydrogen compounds besides phenols and alcohols may be used to prepare the polyglycidyl adducts of this invention. They include amines, aminoalcohols or aminophenols, and polycarboxylic acids.

Examples of such adducts include N,N-diglycidyl aniline, N,N-diglycidyl toluidine, N,N,N',N'-tetraglycidylxylylene diamine, N,N,N',N'-tetraglycidyl-bis(-methylamino)cyclohexane, N,N,N',N'-tetraglycidyl-4,4'-diaminodiphenyl methane, and the like. Commercially available resins of this type include Glyamine 135 and Glyamine 125 (obtained from F.I.C. Corporation, San Francisco, CA.), Araldite MY-720 (obtained from Ciba Geigy Corporation) and PGA-X and PGA-C (obtained from The Sherwin-Williams Co., Chicago, Ill.).

Suitable polyglycidyl adducts derived from aminoalcohols include O,N,N-triglycidyl-4-aminophenol, available as Araldite 0500 or Araldite 0510 (obtained from Ciba Geigy Corporation) and O,N,N-triglycidyl-3-aminophenol (available as Glyamine 115 from F.I.C. Corporation).

Also suitable for use herein are the glycidyl esters of carboxylic acids. Such glycidyl esters include, for example, diglycidyl phthalate, diglycidyl terephthalate, diglycidyl isophthalate, and diglycidyl adipate. There may also be used polyepoxides such as triglycidyl cyanurates and isocyanurates, and other epoxy-containing materials such as copolymers of acrylic acid esters of glycidol such as glycidyl acrylate and glycidyl methacrylate with one or more copolymerizable vinyl compounds.

The second group of epoxy resins is prepared by epoxidation of dienes or polyenes. Resins of this type include bis(2,3-epoxycyclopentyl)ether, and its reaction products with ethylene glycol which are described in U.S. Pat. No. 3,398,102. Commercial examples of these epoxides include vinylcyclohexene dioxide, e.g., "ERL-4206" (obtained from Union Carbide Corp.), 3,4-epoxycyclohexylmethyl 3,4-epoxycyclohexane carboxylate, e.g., "ERL-4221" (obtained from Union Carbide Corp.), 3,4-epoxy-6-methylcyclohexylmethyl 3,4-epoxy-6-methylcyclohexane carboxylate, e.g., "ERL-4201" (obtained from Union Carbide Corp.), bis(3,4-epoxy-6-methylcyclohexylmethyl)adipate, e.g., "ERL-4289" (obtained from Union Carbide Corp.), dipentene dioxide, e.g., "ERL-4269" (obtained from Union Carbide Corp.), 2-(3,4-epoxycyclohexyl-5,5-spiro-3,4-epoxy)cyclohexanemetadioxane, e.g., "ERL-4234" (obtained from Union Carbide Corp.) and epoxidized polybutadiene, e.g., "Oxiron 2001" (obtained from FMC Corp.)

Other epoxy resins not specifically descirbed above may also be used as modifiers in the bismaleimide formulations of the present invention.

Also included as epoxy modifiers are epoxy-terminated thermoplastic polymers such as epoxy-terminated polysulfone and other similar resins.

If epoxy resins are used, it is desirable to add an aromatic diamine to the formulation. The diamine should have a low level of reactivity with epoxy resin and the bismaleimide at room temperature. Suitable diamines include 4,4'-diaminodiphenyl sulfone, 3,3'-diaminodiphenyl sulfone, 3,4'-diaminobenzophenone, 4,4'-diaminobenzophenone, 4,4'-bis(3-aminophenoxy)-diphenyl sulfone, and the like. A stoichiometry of 0.1 to 1.0 equivalents of —NH per equivalent of (1,2-epoxide group plus maleimide group) may be used.

Diamines may also be used even if no epoxy is used. In this case the diamines may react prior to or during the cure cycle with the bismaleimides. When epoxies are present, the diamines may react with either the epoxy or maleimide groups.

The composition may additionally contain an accelerator to increase the rate of cure of the epoxy plus amine reaction. These additives may also be used to increase the degree of cure of an epoxy resin in the absence of an amine hardener.

Accelerators which may be used herein include Lewis acids; amine complexes, such as BF₃.monoethylamine, BF₃.piperdine, BF₃.2-methylimidazole; amines, such as imidazole and its derivatives, such as 4-ethyl-2-methylimidazole, 1-methylimidazole, 2-methylimidazole; N,N-dimethylbenzylamine; acid salts of tertiary amines, such as the p-toluene sulfonic acid-:imidazole complex, salts of trifluoro methane sulfonic acid, such as FC-520 (obtained from 3M Company), organophosphonium halides and dicyandiamide. If used, the accelerator may be from 1 to 6 percent by weight of the epoxy component.

The composition may also contain compounds with one or more cyanate ester groups.

By cyanate ester is meant a compound having at least one cyanate group in its molecule. The cyanate ester is represented by the formula R—(O—C≡N)$_m$ wherein R is a residue derived from an aromatic hydrocarbon selected from the group consisting of benzene, biphenyl and naphthalene, or a residue derived from a compound in which at least two benzene rings are bonded to each other by a bridging member selected from the group consisting of

wherein R$^1$ and R$^2$ are the same or different and each represents a hydrogen atom or an alkyl group containing 1 to 4 carbon atoms,

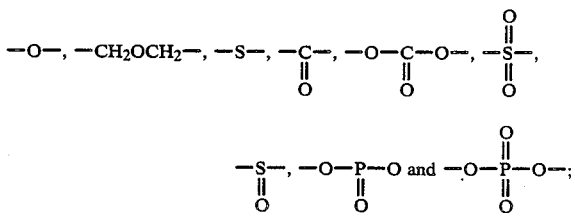

said aromatic nucleus is optionally substituted by a substituent selected from the group consisting of alkyl groups containing 1 to 4 carbon atoms, alkoxy grouips containing 1 to 4 carbon atoms, chlorine and bromine; m is an integer of 1 to 5, and the cyanate group is always directly bonded to the aromatic nucleus.

Examples of the cyanate ester include cyanatobenzene, dicyanatobenzene;
1,3,5-tricyanatobenzene;
1,3-, 1,4-, 1,6-, 1,8-, 2,6- or 2,7-dicyanatonaphthalene;
1,3,6-tricyanatonaphthalene;
4,4'-dicyanatobiphenyl;
bis(4-cyanatophenyl)methane;
2,2-bis(4-cyanatophenyl)propane;
2,2-bis(3,5-dimethyl-4-cyanatophenyl)propane;
2,2-bis(3,5-dichloro-4-cyanatophenyl)propane;
2,2-bis(3,5-dibromo-4-dicyanatophenyl)propane;
bis(4-cyanatophenyl)ether;
bis(4-cyanatophenyl)thioether;
bis(4-cyanatophenyl)sulfone;
tris(4-cyanatophenyl)phosphite;
tris(4-cyanatophenyl)phosphate;
bis(3-chloro-4-cyanatophenyl)methane;
cyanated novolak; cyanated bisphenol terminated polycarbonate or other thermoplastic oligomer; and mixtures thereof.

The above mentioned cyanate esters may be used as mixtures.

Prepolymers may be used containing a symmetrical triazine ring which is prepared by the trimerization of the cyanate groups of the cyanate ester, and which have an average molecular weight of at least 400 but no more than 6,000. Such prepolymers can be prepared by thermally polymerizing the above cyanate esters in the presence or absence of a catalyst.

The cyanate ester can be used in the form of a mixture of the monomer and the prepolymer.

Commercially available materials containing cyanate esters may be obtained from Mitsubishi Gas Chemical Co., Tokyo, Japan and Celanese Specialty Resins Company, Jefferson, KY.

The compositions of this invention may optionally contain a thermoplastic polymer. These materials have beneficial effects on the viscosity and film strength characteristics of the bismaleimide/liquid coreactant mixture and may also have beneficial effects on the properties of reinforced composites made from these resins.

The thermoplastic polymers used in this invention include polyarylethers of formula XIX which are described in U.S. Pat. Nos. 4,108,837 and 4,175,175,

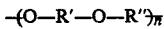   XIX wherein R' is a residuum of a dihydric phenol such as bisphenol A, hydroquinone, resorcinol, 4,4-biphenol, 4,4'-dihydroxydiphenyl sulfone, 4,4'-dihydroxy-3,3',5,5'-tetramethyldiphenyl sulfide, 4,4'-dihydroxy-3,3',5,5'-tetramethyldiphenyl sulfone and the like. R" is a residuum of a benzenoid compound susceptible to nucleophilic aromatic substitution reactions such as 4,4'-dichlorodiphenyl sulfone, 4,4'-diflurobenzophenone, and the like. The average value of n is from about 8 to about 120.

Other suitable polyarylethers are described in U.S. Pat. No. 3,332,209.

Also suitable are polyhydroxyethers of the formula:

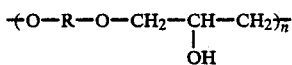   XX where R has the same meaning as for Formula XVIII and the average value of n is between about 8 and about 300. Other suitable thermoplastics include poly(ϵ-caprolactone); polybutadiene; polybutadiene/acrylonitrile copolymers, including those optionally containing epoxy, vinyl, acrylic, methacrylic, amine, carboxyl, hydroxy, or thiol groups; polyesters, such as poly(butylene terephthalate) and poly(ethylene terephthalate); polyetherimides such as the Ultem resins (obtained from the General Electric Company); polycarbonate such as the Lexan resins (obtained from the General Electric Company); acrylonitrile/lbutadiene/styrene copolymers; polyamides such as nylon 6, nylon 6,6, nylon 6,12, and Trogamid T (obtained from Dynamit Nobel Corporation); poly(amideimides) such as Torlon (obtained from Amoco Chemical Corporation, Napierville, IL); polyolefins; polyethylene oxide; poly(butyl methacrylate); impact-modified polystyrene; sulfonated polyethylene; polyarylates such as those derived from bisphenol A and isophthalic and terephthalic acid; poly(2,6-dimethyl phenylene oxide) and its copolymers; polyvinyl chloride and its copolymers; polyacetals; polyphenylene sulfide and the like.

Poly(vinyl acetate) and copolymers of vinyl acetate with other vinyl and acrylic monomers may also be used. Thermoplastics such as low profile additives, for example, LP-40A, may also be used.

Also suitable are vinyl methyl or vinyl phenyl silicone rubbers such as polymers of the formula —R$_2$SiO— wherein up to 10% of the R groups are vinyl, the remainder being either methyl and/or phenyl.

Particularly suitable are rubber modifiers, such as butadiene polymers and butadiene/acrylonitrile copolymers including those optionally containing terminal and/or pendent amine, epoxy, carboxyl, hydroxyl, thiol, or unsaturated double bond groups, such as acrylates or methacrylates or vinyls. These are exemplified by the Hycar Reactive Liquid Polymers available from B. F. Goodrich, the 1,2-polybutadiene resins available from Nippon Soda Co., the polybutadiene resins available from Arco Chemical Co. (as poly-BD resins) and others. Elastomers such as ethylene/acrylic copolymers, exemplified by the Vamac resins available from DuPont, and other elastomeric polymers and copolymers may also be used. Also suitable are the polyester elastomers such as the Vitel resins (Vitel 307, etc.) which are available from B. F. Goodrich.

The preferred thermoplastics include polysulfones, phenoxy resins, polyarylates, the butadiene/acrylonitrile copolymers described above and the polyester elastomers. Mixtures of such thermoplastic modifiers may also be used.

The structural fibers which are useful in this invention include carbon, graphite, glass, silicon carbide, poly(benzothiazole), poly(benzimidazole), poly(benzoxazole), aluminum, titanium, boron, and aromatic polyamide fibers. These fibers are characterized by a tensile strength of greater than 100,000 psi, a tensile modulus of greater than two million psi, and a decomposition temperature of greater than 200° C. The fibers may be used in the form of continuous tows (1000 to 400,000 filaments each), woven cloth, whiskers, chopped fiber or random mat. The preferred fibers are carbon fibers, aromatic polyamide fibers, such as Kevlar 49 fiber (obtained from E. I. DuPont de Nemours, Inc., Wilmington, DE), and silicon carbide fibers.

The compositions of the resin formulations of the invention contain 1 to 99 weight percent, preferably 20–90 percent of the bismaleimide; 1 to about 70 percent, preferably 10 to 60 percent of the olefin ether coreactant; 0–50 percent of an additional mixture of coreactants comprising molecules with one or more amino, epoxy, cyanate, vinyl groups such as —CH=CH$_2$, >C=CH$_2$, or —CH=CH— and other functionalities as described above; and 1 to about 40 percent, preferably 2 to 30 percent of other additives, such as thermoplastic polymers and other coreactants.

Additional components in the composition include initiators for vinyl polymerization such as di-t-butyl peroxide, dicumyl peroxide, 1,1-bis(t-butylperoxy)cyclohexane, azo bis-(isobutyronitrile), t-butyl perbenzoate, and the like. The initiator comprises from 0 to 3 percent by weight of the total composition.

Inhibitors for vinyl polymerizations may also be used. They include hydroquinone, t-butyl hydroquinone, benzoquinone, p-methoxyphenol, and 4-nitro-m-cresol. Inhibitors are present in amounts of from 0 to 2 percent by weight of the total composition.

When a structural fiber is used, the amount of fiber in the total composition is between about 10 and about 90 percent by weight, preferably between about 20 to about 85 percent by weight.

Preimpregnated reinforcement may be made from the compositions of this invention by combining the resin formulations with a structural fiber.

Preimpregnated reinforcement may be prepared by several techniques known in the art such as wet winding or hot melt. In one method of making impregnated tow or undirectional tape, the resin is first coated as a thin film on release paper. Two rolls of this coated paper plus aligned tows of carbon fiber are then pressed together and passed through a series of heated rollers to effect wet-out of the fiber tows by the resin. The thusly formed prepreg is then allowed to cool and taken up on a spool.

Composites may be prepared by curing the preimpregnated reinforcement using heat and optionally pressure. Vacuum bag/autoclave cures work well with these compositions. Laminates may also be prepared via wet lay up followed by compression molding, resin transfer molding, or by resin injection, as described in European patent application No. 0019149 published Nov. 26, 1980. Typical cure temperatures are 100° F. to 600° F., preferably 180° F. to 490° F.

The compositions of this invention may also be used for filament winding. In this composite fabrication process, continuous reinforcement in the form of tape or tow—either previously impregnated with resin or impregnated during winding—is placed over a rotating and removable form or mandrel in a previously determined pattern. Generally the shape is a surface of revolution and contains end closures. When the proper number of layers are applied, the wound form is cured in an oven or autoclave and the mandrel removed.

Tacky drapable prepreg can be obtained with a wide variety of compositions. Long prepreg shelf lives can be obtained-typically one to four weeks.

The compositions of this invention may be used as matrix resins for composites, high temperature coatings, and adhesives. When reinforced with structural fibers, they may be used as aircraft parts such as wing skins, wing-to-body fairings, floor panels, flaps, radomes; as automotive parts, such as drive shafts, bumpers, and springs; and as pressure vessels, tanks and pipes. They are also suitable for protective armor on military vehicles and sporting goods applications such as golf shafts, tennis rackets, and fishing rods.

In addition to structural fibers, the composition may also contain particulate fillers such as talc, mica, calcium carbonate, aluminum trihydrate, glass microballoons, phenolic thermospheres, and carbon black. Up to half of the weight structural fiber in the composition may be replaced by filler. Thixotropic agents such as fumed silica may also be used.

EXAMPLES

The following examples serve to give specific illustrations of the practice of this invention but they are not intended in any way to limit the scope of this invention.

EXAMPLE 1

Preparation of 2-methoxy-4-allyl-1-allyloxybenzene (allyl ether of Eugenol)

A 5 l 4-neck flask equipped with an overhead stirrer, addition funnel, reflux condenser, nitrogen inlet and outlet, and heating mantle was charged with 2 l n-propanol, 656.8 g of Eugenol, and 165.0 g of freshly opened sodium hydroxide pellets. The mixture was stirred and heated at reflux until the sodium hydroxide had dissolved.

400 ml of allyl chloride was then slowly added over 20 minutes while gentle reflux was continued. The lemon yellow reaction mixture was then refluxed an additional 5 hours and stirred at room temperature overnight.

The precipitated sodium chloride was removed by filtration and the n-propanol was stripped under vacuum on a rotary evaporator. The crude product was diluted with 2 l of methylene chloride and that solution washed twice with water and twice with brine. The methylene chloride was removed under vacuum on a rotary evaporator and the product then filtered through sodium sulphate and held under vacuum overnight. The yield of liquid diluent was 811 g and the NMR was consistent with the expected structure shown below.

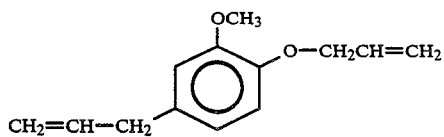

The boiling point of this diluent was over 250° C. at atmospheric pressure. The diluent was stable up to that temperature and, even when cured in the presence of a free radical inhibitor (see schedule A as discussed hereinbelow), showed only partial cure and could not be tested mechanically.

EXAMPLE 2

Preparation of 4,4'-diallyloxydiphenylisopropylidene (diallyl ether of bisphenol A)

A 3 l 4-neck flask equipped as in Example 1 was charged with 1 l n-propanol, 228 g of Bisphenol A, and 82.5 g of freshly opened sodium hydroxide pellets. The mixture was stirred and heated at reflux until the sodium hydroxide had dissolved and 200 ml of allyl chloride was then added slowly while gentle reflux was continued. The reaction mixture was refluxed an additional 6 hours and then stirred at room temperature overnight.

The precipitated sodium chloride was removed by filtration and the n-propanol was stripped under vacuum on a rotary evaporator. The crude product was diluted with 1 l of methylene chloride and that solution washed twice with water and once with brine. The methylene chloride was stripped on a rotary evaporator and the product filtered through sodium sulphate and held under vacuum overnight. The yield was 148 g and the NMR was consistent with the expected structure shown below.

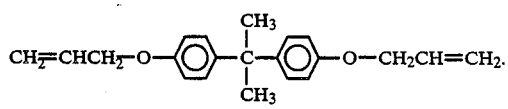

The boiling point of this diluent was over 250° C. at atmospheric pressure. The diluent was stable up to that temperature and, even when cured in the presence of a free radical initiator (cure schedule A as discussed hereinbelow), showed only partial cure and could not be tested mechanically.

EXAMPLE 3

Preparation of meta-diallyloxybenzene

A 3 l 4-neck flask equipped as in Example 1 was charged with 1.5 l dimethylformamide, 110.1 g resorcinol, and 345 g of anhydrous potassium carbonate. The mixture was stirred and heated at 100° C. until most of the carbonate was in solution and 200 ml of allyl chloride was then added over about 1 hour. Heating was continued for 5.5 more hours and the reaction was then stirred overnight at room temperature.

The reaction mixture was diluted with 1 l of methylene chloride and that solution was washed six times with brine. The methylene chloride solution was then filtered through sodium sulphate and the methylene chloride was removed under vacuum on a rotary evaporator. The liquid residue was held under vacuum overnight. The yield was 157 g and the NMR was consistent with the expected structure shown below.

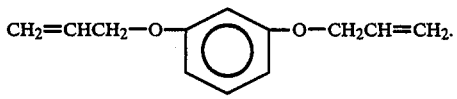

The boiling point of this diluent was over 250° C. at atmospheric pressure. The diluent was stable up to that temperature and, even when cured in the presence of a free radical initiator (cure schedule A as discussed hereinbelow), showed only partial cure and could not be tested mechanically.

EXAMPLE 4

Preparation of 1,3-diallyloxy-2-methylbenzene

A 3 l 4-neck flask equipped as in Example 1 was charged with 1.5 l of dimethyl acetamide, 124 g of 2-methylresorcinol, and 345 g of anhydrous potassium carbonate. The mixture was stirred and heated to 100° C. A 200 ml charge of allyl chloride was then added over 1 hr. Heating and stirring were continued for 5.5 hrs. The mixture was then stirred and let cool overnight.

The reaction mixture was diluted with 2 l of methylene chloride and that solution was washed with four 2 l portions of water, twice with dilute (0.25M) potassium carbonate, and four 2 l portions of brine to give a light gold solution. The solution was filtered through sodium sulfate and the methylene chloride was then removed on a rotary evaporator to give 191 g of a liquid product. The NMR was consistent with the expected structure shown below.

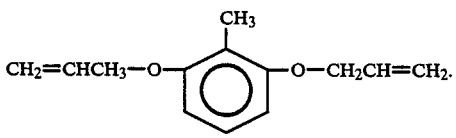

The boiling point of this diluent was over 250° C.

The diluents prepared in Example 1–4 were all odor-free or possessed a mild odor. All had boiling points of over 250° C. and were stable, showing no signs of gellation up to that temperature, even in the absence of inhibitors.

EXAMPLE 5

Bismaleimide/diluent mixture

A mixture of 6.6 g of SED-M bismaleimide (4,4'-bis(3-maleimidophenoxy)diphenyl sulfone) and 3.4 g of the diallyl ether of Bisphenol A (product in Example 2) was blended on a rotary evaporator at 125° C. until homogeneous. It was mixed and held under vacuum an additional 10 minutes for de-gassing and then poured into a small casting frame formed from glass plates and a 1/16" Teflon spacer gasket. The clear mixture was cured according to the following schedule:

| | |
|---|---|
| 25° C. → 79° C. at 1.5°/min. | Hold 2 hrs. |
| 79° C. → 177° C. at 1.5°/min. | Hold 4 hrs. |
| 177° C. → 246° C. at 1°/min. | Hold 4 hrs. |
| 246° C. → 25° C. at 1.5°/min. | |

The cured casting was found to have a Tg (peak of damping curve) of 240° C. (DMA scan at 5° C./min.) and absorbed 1.6% water during a 2-week soak at 160° F.

EXAMPLES 6–20

The procedure of Example 5 was repeated using the ingredients listed in Table I. The Tg and water absorption data for the cured materials is also listed in Table I.

In some cases, an alternate cure schedule was used, and details of the cure schedules are given in the Table notes. Some resins were mixed at 140° C. instead of 125° C.

TABLE I

Formulation Castings (Bismaleimide/Diluent)

| Example | Bismaleimide | Diluent | Cure | Tg (°C.) | % H$_2$O Absorbed[10] |
|---|---|---|---|---|---|
| 5 | 6.6 SEDM[1] | 3.4 DEBA[6] | A | 245 | 2.1 |
| 6 | 7.4 SEDM[1] | 2.6 ECO[7] | A | 280 | 2.6 |
| 7 | 7.6 SEDM[1] | 2.4 DER[8] | A | 285 | 2.1 |
| 8 | 6.5 BAPP[2] | 3.5 DEBA | A | 225 | 2.5 |
| 9 | 6.5 BAPP[2] | 3.5 DEBA | B | 222 | 3.1 |
| 10 | 7.4 BAPP[2] | 2.6 DEBA | B | 260 | 2.6 |
| 11 | 7.4 BAPP[2] | 2.6 ECO | A | 310 | 2.6 |
| 12 | 7.4 BAPP | 2.6 DAMR[9] | A | 270 | |
| 13 | 7.0 BAM[3] | 3.0 ECO | A | 265 | 2.1 |
| 14 | 6.6 TPE[4] | 3.1 ECO | B | 320 | 3.8 |
| 15 | 5.4 COMP. 353[5] | 4.6 DEBA | A | 260 | 3.1 |
| 16 | 6.2 COMP. 353[5] | 3.8 DEBA | B | 280 | 4.4 |
| 17 | 6.2 COMP. 353[5] | 3.8 ECO | A | 360 | 4.7 |
| 18 | 6.2 COMP. 353[5] | 3.8 ECO | C | 355 | 4.0 |
| 19 | 6.2 COMP. 353[5] | 3.8 ECO | D | 360 | 4.1 |
| 20 | 6.8 COMP. 353[5] | 3.2 ECO | C | 370 | 4.4 |
| 21 | 6.2 COMP. 353 | 3.8 DAMR | A | 310 | |

Table I Notes
[1] 4,4'-bis(3-maleimidophenoxy) diphenyl sulfone.
[2] 4,4'-bis(4-maleimidophenoxy) diphenyl isopropylidene.
[3] α,α'-bis(4-maleimidophenoxy)-meta-diisopropyl-benzene.
[4] 1,3-bis(4-maleimidophenoxy)benzene.
[5] Compimide 353. A bismaleimide mixture available commercially from Boots-Technochemie.
[6] Diallyl ether of bisphenol A (Example 2).
[7] Allyl ether of Eugenol (Example 1).
[8] Diallyl ether of resorcinol (Example 3).
[9] Diallyl ether of 2-methylresorcinol (Example 4).
[10] 2 week soak in 160° F. water.

Cure Schedules (°C.)
A 25 → 79 at 1.5°/min., hold 2 hrs.
79 → 177 at 1.5°/min., hold 4 hrs.
177 → 246 at 1°/min., hold 4 hrs.
246 → 25 at 1.5°/min.
B 25 → 177 at 1.5°/min., hold 6 hrs.
177 → 246 at 1°/min., hold 4 hrs.
246 → 25 at 1.5°/min.
C 25 → 79 at 1.5°/min., hold 2 hrs.
79 → 177 at 1.5°/min., hold 4 hrs.
177 → 235 at 1°/min., hold 4 hrs.
235 → 25 at 1.5°/min.
D 25 → 79 at 1.5°/min., hold 2 hrs.
79 → 177 at 1.5°/min., hold 4 hrs.
177 → 220 at 1°/min., hold 4 hrs.
220 → 25 at 1.5°/min., Examples 18, 19 and 20 illustrate the very high Tg values which can be obtained under reduced post cure temperatures with one of the diluents of this invention.

EXAMPLE 22–37

The procedure of Example 5 (some examples were mixed at 140° C. instead of 125° C.) was repeated using the ingredients listed in Table II. In these Examples, the basic bismaleimide/diluent mixture was modified by the addition of various cyanate ester resin modifiers.

TABLE II
FORMULATION CASTINGS (BISMALEIMIDE/DILUENT/CYANATE MODIFIERS)

| Example | Bismaleimide[1] | Diluent[1] | Modifier | Cure | Tg (°C.) | % H$_2$O Absorbed |
|---|---|---|---|---|---|---|
| 22 | 4.8 SED-M | 1.6 DER | 3.6 BT2160[2] | A | 257 | 1.9 |
| 23 | 7.0 BAPP | 2.5 DEBA | 0.5 BT2160 | B | 255 | 2.2 |
| 24 | 7.0 BAPP | 2.5 ECO | 0.5 BT2160 | B | 300 | 2.9 |
| 25 | 6.7 BAPP | 2.3 ECO | 1.0 BT2160 | B | 292 | 3.0 |
| 26 | 6.7 BAPP | 2.3 ECO | 1.0 BT2164[3] | B | 276 | 3.0 |
| 27 | 6.3 BAPP | 2.2 ECO | 1.5 BT2164 | A, B | 270 | 2.7 |
| 28 | 5.7 BAPP | 2.3 ECO | 2.0 BT2164 | A | 265 | 2.0 |
| 29 | 6.3 TPE | 2.7 DEBA | 1.0 BT2160 | B | 245 | 3.1 |
| 30 | 6.2 TPE | 2.8 ECO | 1.0 BT2160 | B | 284 | 2.7 |
| 31 | 6.2 TPE | 2.8 DAMR | 1.0 BT2164 | A | 275 | |
| 32 | 3.3 COMP. 353 | 3.1 DEBA | 3.6 BT2160 | A | 234 | 2.4 |
| 33 | 4.0 COMP. 353 | 2.4 ECO | 3.6 BT2160 | A | 258 | 2.9 |
| 34 | 6.0 COMP. 353 | 2.5 ECO | 1.5 BT2164 | A | ~280 | 4.3 |
| 35 | 6.5 COMP. 353 | 2.0 ECO | 1.5 BT2164 | A | ~300 | 4.5 |
| 36 | 6.25 COMP. 353 | 2.0 ECO | 1.75 BT2164 | A | ~300 | 3.9 |
| 37 | 6.0 COMP. 353 | 2.0 ECO | 2.0 BT2164 | A | ~270 | 4.7 |

Table II Notes
[1] See Table I Notes.
[2] A commercially available blend of 10% methylene dianiline bismaleimide and 90% 2,2-bis(4-cyanatopehnyl)propane obtained from Mitsubishi Gas Chemical Co., Inc., Japan.
[3] A commercially available resin similar to BT 2160, but modified with polyester elastomers, obtained from Mitsubishi Gas Chemical Co., Inc., Japan.

EXAMPLE 38-49

The procedure of Example 5 was repeated using the ingredients in Table III. In these examples the basic bismaleimide mixture was modified by the addition of the thermoplastic mixtures.

TABLE III
FORMULATION CASTINGS (BISMALEIMIDE/DILUENT/THERMOPLASTIC MODIFIERS)

| Example | Bismaleimide[1] | Diluent[1] | Modifier | Cure | Tg (°C.)[6] | % H$_2$O Absorbed |
|---|---|---|---|---|---|---|
| 38 | 6.7 BAPP | 2.3 ECO | 1.0 VTBN[3] | A | ~260 | 1.2 |
| 39 | 6.7 BAPP | 2.3 ECO | 1.0 CTBN[4] | A | ~230 | 1.6 |
| 40 | 6.9 BAPP | 2.5 ECO | 0.6 PETP[5] | A | ~300 | 2.6 |
| 41 | 6.9 BAPP | 2.3 ECO | 0.8 VTBN | A | ~320 | 2.3 |
| 42 | 6.2 TPE | 2.8 ECO | 1.0 CTBN | B | ~260 | 2.7 |
| 43 | 7.5 Comp. 453[2] | 2.5 DEBA | (25% CTBN)[2] | A | 200 | 2.4 |
| 44 | 7.5 Comp. 453 | 2.5 ECO | (25% CTBN) | A | ~360 | 2.0 |
| 45 | 8.0 Comp. 453 | 2.0 ECO | (26% CTBN) | A | ~360 | 2.7 |
| 46 | 6.0 Comp. 453 2.0 Comp. 353 | 2.0 ECO | (20% CTBN) | A | ~360 | 3.3 |
| 47 | 6.0 Comp. 453 1.5 Comp. 353 | 2.5 ECO | (20% CTBN) | A | ~360 | 2.9 |
| 48 | 3.0 Comp. 453 3.6 Comp. 353 | 3.4 ECO | (10% CTBN) | A | ~350 | 2.4 |
| 49 | 6.0 Comp. 353 | 3.6 ECO | 0.4 PSF (UDEL) | A | >300 | 4.5 |

Table III Notes
[1] See Table I Notes.
[2] A commercially available blend of 2 parts Compimide 353 bismaleimide and 1 part CTBN[4] rubber obtained from Boots-Technochemie. In those resins containing Compimide 453, the weight percent CTBN in the resin is given in parenthesis in the modifier column.
[3] Vinyl-terminated butadene/acrylonitrile liquid rubber, VTBN 1300X22, obtained from B. F. Goodrich Co.
[4] Carboxyl-terminated butadene/acrylonitrile liquid rubber, either CTBN 1300X8 or CTBN 1300X13, obtained from B. F. Goodrich Co.
[5] A 50/50 blend of two thermoplastic elastomeric polyesters LP-011 and LP-035, both from Nippon Gosei, Japan. Both have a M.W. of about 16,000.
[6] Many of the rubber-modified resins showed a broad Tg via DMA.

Examples 44, 45, 46 and 47 illustrate the particular advantage of ECO in providing processible resins with high levels (i.e., >10%) of rubber modifiers. The low viscosity of ECO is very useful in formulations of this type while still providing high Tg's and thermal stability before and after cure.

EXAMPLES 50-54

The procedure of Example 5 was repeated using the ingredients listed in Table IV. In these examples the bismaleimide/diluent mixture was modified by the addition of a thermoplastic polymer plus a cyanate ester compound.

TABLE IV
FORMULATION CASTINGS (BISMALEIMIDE/DILUENT/MODIFIERS)

| Example | Bismaleimide[1] | Diluent[1] | Modifier | | Cure | Tg (°C.) | % H$_2$O Absorbed |
|---|---|---|---|---|---|---|---|
| 50 | 6.2 BAPP | 2.2 ECO | 1.0 BT 2160 | 0.6 PETP | A | 245 | 2.3 |
| 51 | 5.5 BAPP | 2.5 ECO | 1.0 BT 2160 | 1.0 VTBN | A | 200 | 1.3 |
| 52 | 5.9 BAPP | 2.1 ECO | 1.0 BT 2160 | 1.0 VTBN | B | 240 | 2.0 |
| 53 | 5.9 BAPP | 2.1 ECO | 1.0 BT 2160 | 1.0 CTBN | B | 215 | 3.2 |
| 54 | 6.25 Comp. 353 | 1.6 ECO | 1.75 BT 2164 | 0.4 PETP | A | ~290 | 4.0 |

(See Table I, II and III Notes).

Tensile properties were obtained according to ASTM D-638 on larger castings (⅛" thick) made from some of the above formulations. These are listed in Table V.

TABLE V

| Example | Tg (°C.) | Tensile Strength | Tensile Modulus | Elongation |
|---|---|---|---|---|
| 44 | ~360 | 6.4 ksi | 326 ksi | 2.8% |
| 41 | ~320 | 6.7 ksi | 459 ksi | 1.8% |
| 11 | 310 | 7.2 ksi | 463 ksi | 1.9% |
| 28 | 265 | 7.2 ksi | 495 ksi | 1.7% |

These properties show an attractive balance of toughness and high Tg values.

EXAMPLE 55

"B-staging" of bismaleimide/diluent Mixture

A mixture of 5.58 g Compimide 353 bismaleimide, 3.42 g ECO diluent, and 1.0 g VTBN X22 liquid rubber (Goodrich Chemical Co.) was blended on a rotary evaporator at 125° C. The low viscosity mixture was periodically sampled and tested for film properties by drawing down a 1 mil film on release paper.

Ten minutes after mixing the sample film was very tacky and showed immediate reticulation or "beading". Such films are generally difficult to use in the preparation of carbon fiber prepreg products. After 30 minutes there was little change in the sampled film. After the mixture had been heated 1.5 hr., the degree and speed of reticulation decreased and the resin mixture was slightly more viscous. Additional samples at 30 minute intervals continued to show improvements in film properties until after about 2.5 hrs. the film showed only small pinholes after standing. The resin was higher in viscosity but still fluid. The film showed tack and was suitable for prepreg fabrication.

EXAMPLE 56

Preparation of Carbon Fiber Composite

A mixture of 1120 g Compimide 353 bismaleimide, 680 g ECO, 200 g VTBN 1300X22, and 40 g Cab-o-Sil (N-70-TS, hydrophobic) was stirred at 125° C. until a film sample withdrawn showed good film properties and little or no reticulation. A total heating period of about 7 hours was used.

The resin mixture was coated on a differential silicone-coated release paper and then fabricated via standard prepregging procedures into a carbon fiber prepreg product using T-40 fibers (12K) from Union Carbide Corporation. An edge delamination test composite, [±25₂/90]ₛ, was fabricated from this prepreg and gave an average edge delamination strength of 21 ksi. The Tg of the resin cured under similar conditions was ~350° C.

What is claimed is:

1. A resin formulation comprising a bismaleimide and as a reactive diluent a diallyl ether selected from the group consisting of the diallyl ethers of dihydric phenols, the diallyl ethers of bisphenols, the diallyl ethers of naphthols, and mixtures thereof.

2. The resin formulation of claim 1 wherein the diallyl ether is selected from the group consisting of the diallyl ether of resorcinol, the diallyl ether of 2-methyl resorcinol, the diallyl ether of hydroquinone, the diallyl ether of bisphenol A, and mixtures thereof.

3. The resins as defined in claim 1, where the reactive diluent is 4,4'-diallyloxydiphenylisopropylidene,

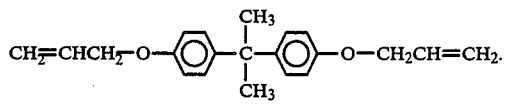

4. The resins as defined in claim 1, where the reactive diluent is meta-diallyloxybenzene,

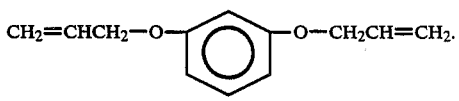

5. The resins as defined in claim 1, where the reactive diluent is 1,3-diallyloxy-2-methylbenzene,

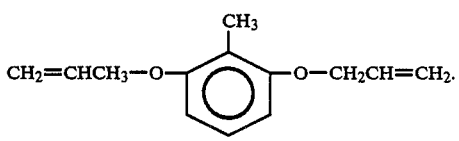

6. The resins as defined in claim 1, in which a mixture of bismaleimides is used.

* * * * *

UNITED STATES PATENT AND TRADEMARK OFFICE
CERTIFICATE OF CORRECTION

PATENT NO. : 4,853,449

DATED : August 1, 1989

INVENTOR(S) : Linda A. Domeier

It is certified that error appears in the above-identified patent and that said Letters Patent is hereby corrected as shown below:

In the Abstract, at line 6, the entry "alkyl ether" should read --allyl ether--. At Column 18, line 26, in Table 1, the entry for Example 14 reading "6.6 $TPE^4$," should read --6.9 $TPE^4$--.

Signed and Sealed this

Thirtieth Day of April, 1991

Attest:

Attesting Officer

HARRY F. MANBECK, JR.

Commissioner of Patents and Trademarks